(No Model.) 7 Sheets—Sheet 1.
J. B. HIPWELL.
CIRCULAR KNITTING MACHINE.

No. 511,335. Patented Dec. 26, 1893.

fig. 1.

WITNESSES:
L. Douville.
P. F. Cagles.

INVENTOR
John B. Hipwell
BY Joshua ......
ATTORNEY.

(No Model.) 7 Sheets—Sheet 2.

J. B. HIPWELL.
CIRCULAR KNITTING MACHINE.

No. 511,335. Patented Dec. 26, 1893.

WITNESSES:
L. Douville,
P. H. Cagle

INVENTOR
John B. Hipwell
BY John A. Wiedersheim
ATTORNEY

(No Model.)

J. B. HIPWELL.
CIRCULAR KNITTING MACHINE.

Patented Dec. 26, 1893.

WITNESSES:
L. Douville,
P. H. Nagles

INVENTOR
John B. Hipwell,
BY John A. Wiedersheim
ATTORNEY.

(No Model.) 7 Sheets—Sheet 4.

J. B. HIPWELL.
CIRCULAR KNITTING MACHINE.

No. 511,335. Patented Dec. 26, 1893.

WITNESSES:
L. Donville,
P. F. Dagle.

INVENTOR
John B. F. Hipwell
BY John A. Biedersheim
ATTORNEY.

THE NATIONAL LITHOGRAPHING COMPANY,
WASHINGTON, D. C.

(No Model.)  7 Sheets—Sheet 5.

J. B. HIPWELL.
CIRCULAR KNITTING MACHINE.

No. 511,335. Patented Dec. 26, 1893.

WITNESSES:
L. Douville,
P. H. Eagle.

INVENTOR,
John B. Hipwell
By John A. Wiedersheim
ATTORNEY.

(No Model.)

J. B. HIPWELL.
CIRCULAR KNITTING MACHINE.

Patented Dec. 26, 1893.

WITNESSES:
L. Douville,
P. H. Chagles.

INVENTOR
John B. Hipwell
BY John A. Wiederscheim
ATTORNEY.

(No Model.)   7 Sheets—Sheet 7.

J. B. HIPWELL.
CIRCULAR KNITTING MACHINE.

No. 511,335.   Patented Dec. 26, 1893.

WITNESSES:
L. Douville,
P. H. Cragle

INVENTOR
John B. Hipwell
BY John A. Wiedersheim
ATTORNEY.

UNITED STATES PATENT OFFICE.

JOHN B. HIPWELL, OF PHILADELPHIA, PENNSYLVANIA.

CIRCULAR-KNITTING MACHINE.

SPECIFICATION forming part of Letters Patent No. 511,335, dated December 26, 1893.

Application filed May 5, 1890. Serial No. 350,581. (No model.)

*To all whom it may concern:*

Be it known that I, JOHN B. HIPWELL, a citizen of the United States, residing in the city and county of Philadelphia, State of Pennsylvania, have invented a new and useful Improvement in Circular-Knitting Machines, which improvement is fully set forth in the following specification and accompanying drawings.

My invention relates to circular knitting machines, and consists, first, of a knitting machine having means substantially as described for connecting or locking the needle dial and needle cylinder; second, of mechanism substantially as described, for connecting the cam and needle dials, and disconnecting the cam dial and cam cylinder, so that the cam and needle dials may operate conjointly, when desired; third, of mechanism connected with the needle cylinder, for withdrawing a portion of the needles on one side thereof from operation; fourth, of mechanism substantially as described, connected with the cam cylinder for supplying an extra or reinforce thread to a portion of the fabric; fifth, of mechanism connected with the cam dial for withdrawing any desired number of needles of the needle dial from operation; finally of the combination and arrangement of parts herein set forth.

Fig. 2½ represents a side view of part of the reinforce thread mechanism showing one means of carrying the bobbin for the reinforcing thread. Fig. 7$^a$ represents a perspective view of detached portions of the machine. Fig. 10$^\times$ represents a plan view of the needle dial.

Similar letters of reference indicate corresponding parts in the several figures.

Referring to the drawings:—A designates a circular knitting machine having a stationary needle cylinder B, and a rotatable cam cylinder C, with a needle dial D and a cam dial E, a thread guiding and feeding device F, and a stitch regulating mechanism G, all of said parts, except the cam and needle dials, being of the construction and operation as shown and described in application made by me for Letters Patent of date of April 21, 1888, Serial No. 271,424, and since they form no part of this invention, are not further described herein. The carrier H which individually supports the cam dial shaft J, has a supporting plate L, secured by screws $L^2$ on the under side thereof, the said plate sustaining the flange or rim M of a collar N, which is secured to the said shaft J. In the outer edge of the rim M, is a recess P, and in the inner edge of the carrier H is a recess Q, the said recesses forming, when opposite each other, an opening adapted to receive a stud or key R, having a cam S on the head thereof, whereby, by means of a cam U on a lever V, the stud R may be withdrawn from said opening, so that the carrier H, and rim M with collar N and shaft J, are free to operate separately. The said key is connected with a spring $R^x$ which normally keeps it in the said opening.

The cam dial E, which is secured to the shaft J below the plate L, by means of a collar W and screw X, has in its edge a recess Y to receive the end of a lever or arm Z attached to the needle dial, so that the said needle dial and cam dial may be locked together when desired.

Figures 12, 13:
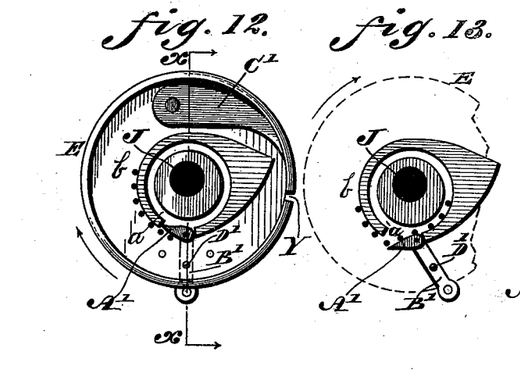
Fig. 12 represents a bottom view of the cam dial.
Fig. 13 represents a view showing the inner cam passage shown in Fig. 12, as open.
Figure 14:
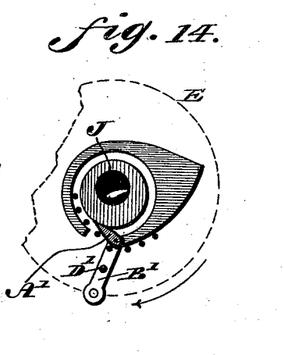
Fig. 14 represents a view showing the inner cam passage, as closed at one end.
Figure 15:
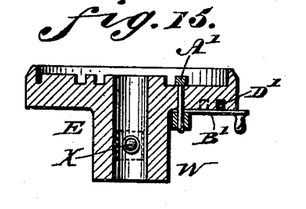
Fig. 15 represents a vertical section on line $x, x$, Fig. 12, showing the cam dial with lever for controlling the switch, the said parts being inverted.
Figure 16:
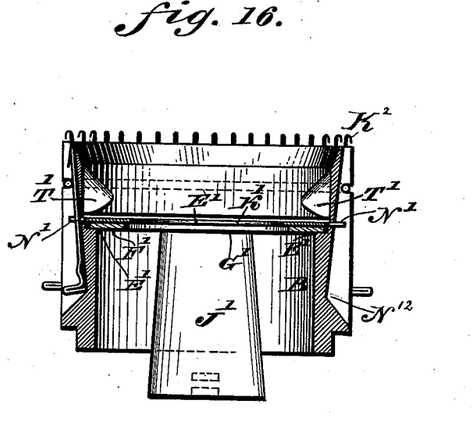
Fig. 16 represents a vertical section of the needle cylinder, and rotating plate for withdrawing a portion of the cylinder needles from operation.
Figure 17:
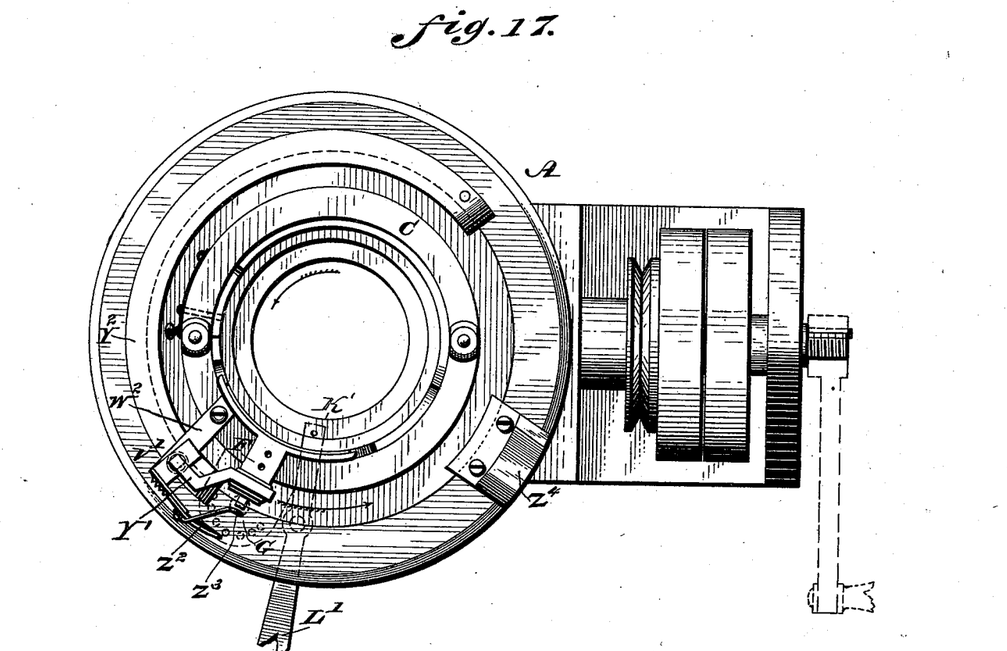
Fig. 17 represents a plan view of a circular knitting machine embodying my invention, the cam dial and carrier thereof, and the needle dial being removed therefrom, so as to show a plan view of the rotating plate shown in Fig. 16, and the operating lever therefor.

On the under side of the cam dial E, are formed two passages, an inner one $a$ of circular form and eccentric to the shaft J, so that the dial needles having their butts guided therein, may be moved to and from the cylinder needles, and an outer one $b$ elliptical in form, and in communication with the said inner track. A switch A' operated by a spring lever B' opens or closes the communication between the passages; and a fixed returning piece C', against which the butts of the needles engage, withdraws the needles within the needle dial. When the switch is closed as shown in Fig. 12, the butts of the needles are engaged by the outside face of the cam, but when the switch is open, as in Fig. 13, the butts of the needles of the needle dial, enter the inner passage way, so that they are withdrawn from operation; when the switch may be closed, and the said needles kept from operation as long as desired. When it is required to release the said needles, the switch is opened as in Fig. 14, when the butts of the needles leave the inner passage, and again come in contact with the outer edge of the cam. The lever B' is locked in place by a stud D' thereon, entering an opening in the upper side of the cam dial.

The inner side of the needle cylinder B is formed with a horizontal slot E', in which is fitted a curved plate F' having a segmental slot G' therein, the inner wall of which has a gate H' for the entrance within the said slot G' of the shank or stem J' of a segmental plate K', which is horizontally moved, by means of a lever L' pivoted on the bed of the machine. The said plate K' is provided on its outer edge with recesses M', and projections N' having shoulders P', the said projections being adapted to engage certain extra hereinafter described cylinder needles, according to the pattern of the segmental plate K', as may be desired, on the movement of said plate, and force the same into the recesses, and the butts of said needles into the depressed portions $N^{12}$ of the cylinder grooves, and thus out of action.

Figure 8:
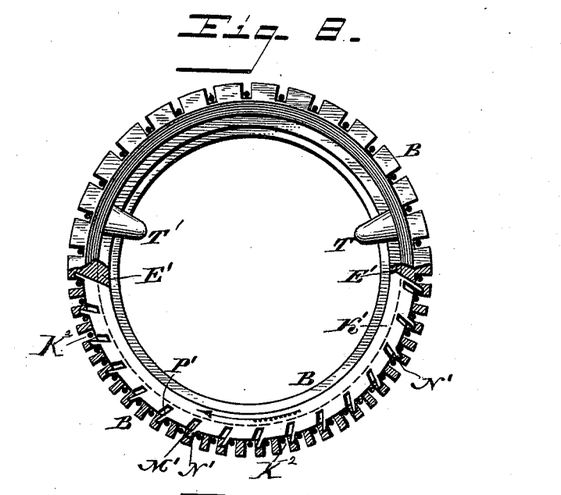
Fig. 8 represents a top view, partly broken away of the needle cylinder showing extra grooves and needles, the extra needles being in operation.
Figure 9:
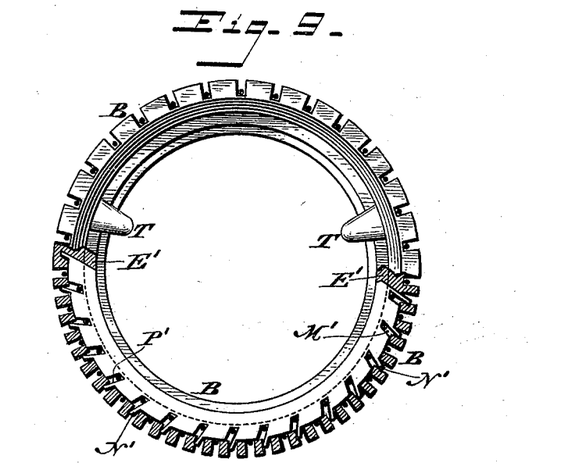
Fig. 9 represents a similar view of the same parts as in Fig. 8, the extra needles being out of operation.
Figure 10:
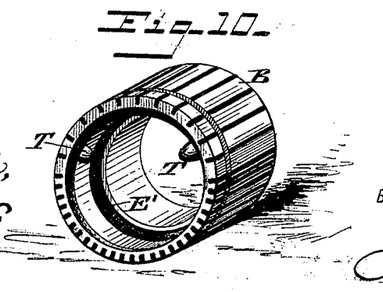
Fig. 10 represents a perspective view of the needle cylinder.
Figure 11:
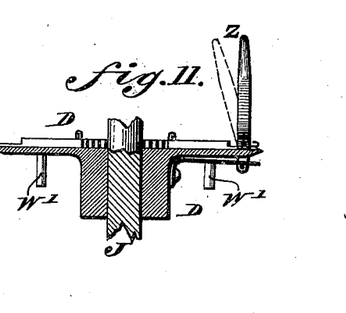
Fig. 11 represents a vertical section thereof, on line $v\ v$ Fig. 10$^\times$ showing the lever for locking the needle dial with the cam dial.
Figures 18, 19, 20, 21, 22, 23:
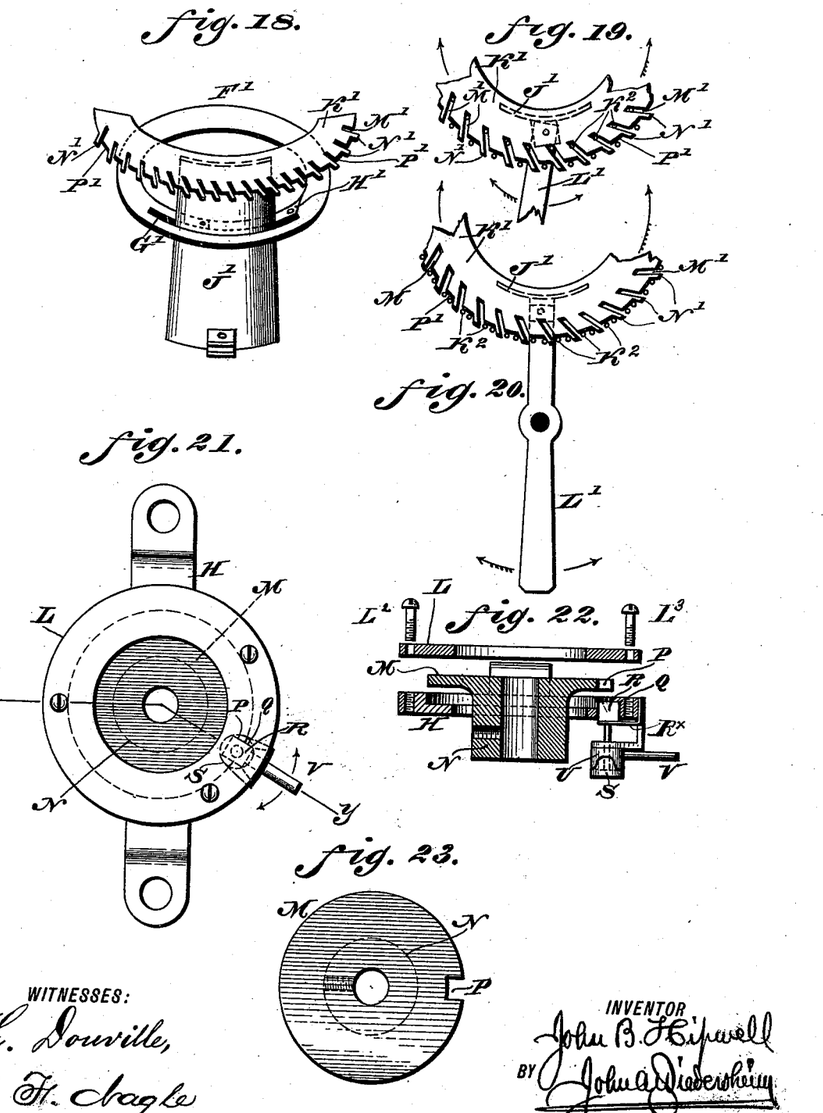
Figs. 18, 19 and 20 represent different views of a portion of the segmental plate for operating the extra cylinder needles, with adjacent parts, the plate being separated from the other parts in Fig. 18 for clearer illustration, and the recesses and projections in the plate in said Figs. 18, 19 and 20, being inclined in reverse direction from that shown in Figs. 8 and 9.
Fig. 21 represents a bottom view of the cam dial carrier.
Fig. 22 represents a vertical section on line $y, y$, Fig. 21; the parts being separate, partly in elevation, and in inverted position.
Fig. 23 represents a bottom view of the plate connected with the cam dial shaft, and resting on the under plate of the carrier.

In Figs. 8 and 9, the recesses or grooves M' and the projections N' in the segmental plate are shown as inclined in an opposite or reverse direction from that shown in Figs. 18, 19 and 20. Either direction of incline may be made as desired, all the recesses and projections being inclined, however, the one way in the same plate.

The inner side of the cam cylinder is provided with an upper horizontal track Q', and a lower horizontal track R', with a controlling switch S', the said upper track being for the travel of the butts of the vertical needles in the making of the heel and toe portions of a stocking, and the lower track for the travel of said needles when making the leg and foot portions. By having a lower track for the needles, less of the upper portions of the same project above the cylinder, whereby there is less elasticity to the upper ends of the said needles, and by having the needles raised during the making of the heel and toe, so that a greater portion of each needle projects above the cylinder than when on the lower track, the said needles are better adapted to be engaged for being thrown out when desired during the forming of said heel or toe. The stitch cams $S^x$ are secured to the inner face of the cam cylinder by means of the screws $G^x$ which pass through the bracket G', and the bosses $G^2$ on the same. The switch S' is pivoted to the cam cylinder on its inner face, and operated by means of the lever $S^2$ on the outside thereof.

On the inner side of the back of the needle cylinder, are two lugs T', and on the under side of the needle dial are two depending lugs W' adapted to engage with, and between the lugs T' of the needle cylinder, and thus lock the needle dial with the needle cylinder, so that the former is kept stationary during the knitting of the tube.

Figure 1:
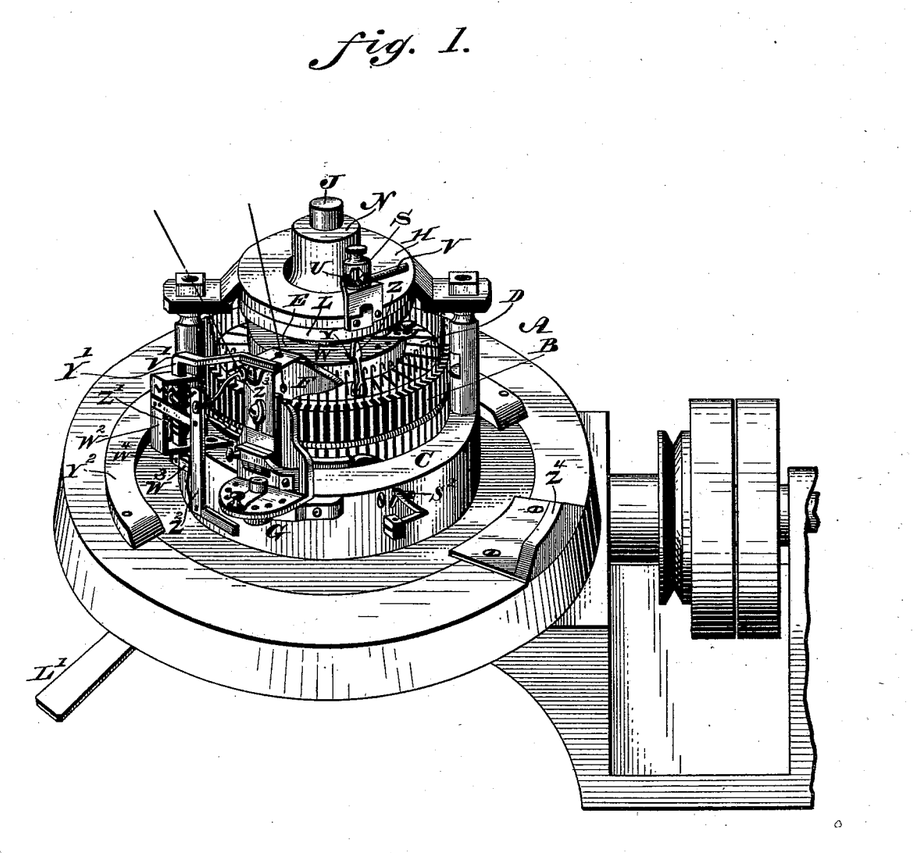
Figure 1 represents a perspective view of a circular knitting machine, embodying my invention.
Figure 2:
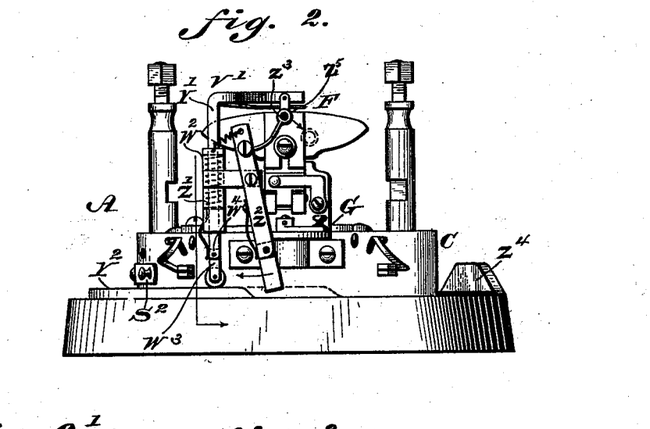
Fig. 2 represents a side view of the bed, cam cylinder, thread guide, &c.
Figures 2, 3:
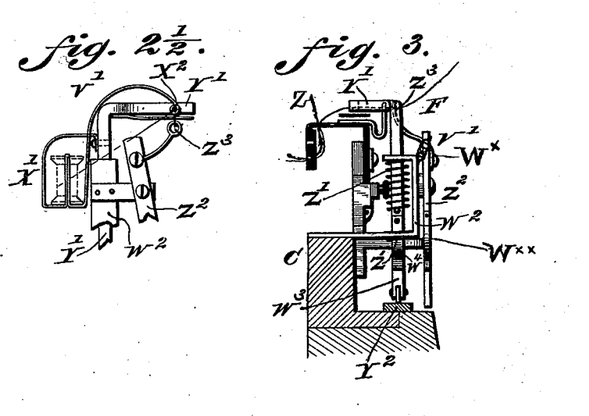
Fig. 3 represents a vertical sectional view of one side of the cam cylinder with mechanism for inserting a reinforce thread in the stocking, as described.
Figure 4:
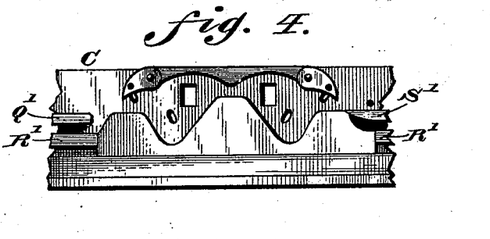
Fig. 4 represents a view of a section of the inner wall of the cam cylinder, showing the openings therein, to permit of attaching and adjusting the cam plates.
Figure 5:
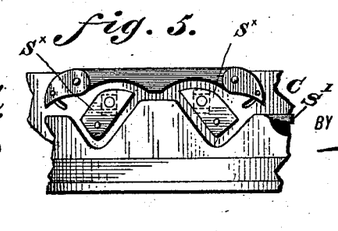
Fig. 5 represents a view of a section of the inner wall of the cam cylinder showing the cam plates attached thereto.
Figure 6:
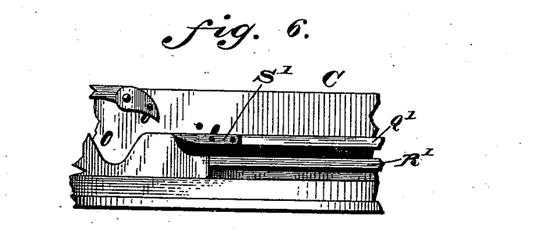
Figs. 6 and 7 represent views of a section of the inner wall of the cam cylinder, showing sections of the two needle ways with switch closed and open, respectively.
Figure 7:
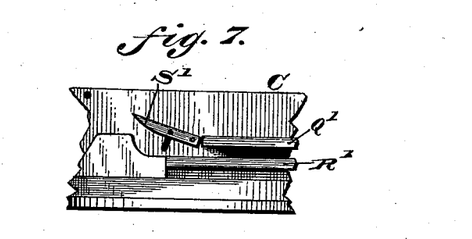
Figure 7A:
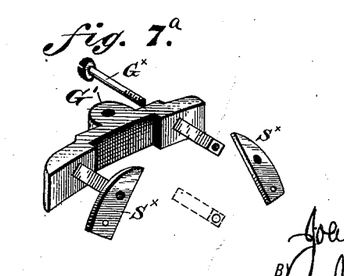

V' designates a device for supplying an extra thread to the stocking, so as to reinforce the same when desired, and consists of a frame $W^2$ secured to the cam cylinder, and as shown in Fig. 2½, said device may have an arm X' secured thereto for supporting the bobbin, and a thread support or guide $X^2$. The device primarily consists of a frame $W^2$ provided with a clamping arm Y' for the thread, the vertical portion of the said arm working in the frame, and having a spring Z' surrounding the same to exert a pressure upon and hold the lower end thereof downward, as will be more fully hereinafter set forth, the upper end of said arm having a spring $Z^5$ on its under face and between which and the upper face of the thread guide F, the reinforce thread is adapted to be held. The lower end of the arm Y' has a pivoted portion $W^3$ with a roller at its lower end, the said roller traveling, a portion of the revolution of the cam cylinder, on a raised plate or elevated portion $Y^2$ of the bed of the machine, so as to raise the upper clamping portion of the arm Y' from the thread which passes through an opening in the thread guide F, and is fed to the knitting needles along with the thread supplied by said guide and feed. A movable arm $Z^2$ having a thread guide $Z^3$ on its upper end, and a pivoted lower portion, is of itself pivoted to the frame $W^2$, and is adapted to have its lower end come in contact with, and ride over a cam $Z^4$ on the bed of the machine, so as to oscillate the arm $Z^2$ and the guide, and thus draw on the thread on the bobbin, thereby loosening the same, and enabling the end thereof between the guide $Z^3$ and the opening in the guide F to be more easily drawn in by the needles. The upper portion of the arm $Z^2$ is connected by a spring $W^\times$ to the frame $W^2$, to normally hold said arm in position, and the lower portion has a jointed part adapted to be raised out of the way of the cam $Z^4$, a spring mounted over the joint normally keeping the arm extended. The arm Y' and pivoted portion $W^3$ thereof have a spring connection $W^4$ of preferably flat formation for keeping the said parts in extended position, when the roller of the pivoted portion is on the raised plate $Y^2$, to raise the arm Y' and thereby release the thread. The jointed construction of arm Y' is provided for a purpose similar to that of arm $Z^2$ and the spring Z' surrounding upper part of said arm Y' keeps the roller in the lower end of the same in regular contact or bearing with the surface upon which it travels.

The operation of the device V' is readily understood. As the cam cylinder revolves, the roller of the pivoted piece $W^3$ rides on the bed of the machine, and the clamping arm Y' is depressed so that the reinforce thread is clamped or held fast between the same and the upper part of the feeding device F; as the swinging arm $Z^2$ comes in contact with the cam $Z^4$, a small portion of the thread is unwound from the bobbin, so that when the roller at the lower end of arm Y' rides upon the cam $Y^2$, and the arm Y' is raised and the thread released, it is readily drawn to the needles.

One half of the needle cylinder is supplied with an extra set of needles $K^2$, located between the front needles of the cylinder, and in front of the needles of the needle dial, and adapted to be thrown, either into, or out of operation, as desired. When making ribbed work, the extra needles are thrown out of operation, and the dial needles on the same side thereof as the extra needles are thrown into operation, but in plain work the said dial needles are withdrawn from operation, and the extra needles of the cylinder thrown in operation, so that the needles on one half of the cylinder are operative for plain work.

In operating the machine, so as to form a tube for a stocking, having a ribbed front and a plain back, with integral pockets for the heel and toe portions, the extra set of needles $K^2$ in front of the needle cylinder, and directly under the needles in the front of the needle dial, is placed in operation by rotating the segmental plate K' by means of the lever L', the needles in the front of the needle dial being first thrown out of operation by opening the gate A' of the inner cam passage-way in the cam dial; thus making twice as many needles in operation in the front of the needle cylinder, as there are in the back thereof, so as to form the plain part of the leg portion; while the needles of the back of the needle cylinder, and the back of the needle dial, form the ribbed portion of said leg. When the pocket is to be made, the needles in the back of the needle cylinder are thrown out of operation by drawing up their butts or cam parts, so as to be free from the cams of the cam cylinder, then throwing out of operation the needles on the back of the needle dial, by locking the cam dial to the needle dial, and releasing the cam dial from the cam cylinder by unlocking the carrier and the part N carrying the cam dial shaft, so as to leave the needles in the front of the needle cylinder free to be operated on to form the pocket for the heel, which is narrowed by revolving the cam cylinder around the needle cylinder, first in one direction, then in the opposite direction, and throwing out of operation as required, one or more needles, first on one side, and then on the other. After being sufficiently narrowed, the pocket is widened by throwing into operation, in the same manner, the needles thrown out for narrowing. After the heel pocket is made, to make a ribbed top and plain bottom for the foot, the needles in the back of the needle cylinder are thrown into operation by lowering the same. The cam dial is then locked to the carrier, and unlocked from the needle dial, when the knitting is continued, forming a ribbed top and plain bottom. The toe pocket is made in the manner already described. If it be desired to form an all ribbed leg portion, the cam switch of the cam dial is opened so as to release the butts of all the dial needles, and then closed so that the same are guided in the cam-way b, and the extra needles on the front of the needle cylinder are thrown out of operation by means of the segmental plate K' and lever L'. To form now the pocket on the ribbed leg, the cam switch of the cam dial is opened so as to withdraw all the needles of the needle dial, and the cam dial is unlocked from the carrier and locked with the needle dial, the needles of the rear of the needle cylinder being drawn up or out of the way of the cams on the cam cylinder, and the extra needles in the front of the needle cylinder thrown into operation and the narrowing and widening of the pocket is performed as before described.

It will be seen that I am enabled to change the operation of the machine from ribbed to plain, or from plain to ribbed fabric as desired, without removing any of the needles from their places on the machine, and by mechanism convenient of access and easy of operation.

In making a tube for a stocking on the machine herein described, I can either make the leg portion partly or wholly ribbed as desired, with a plain pocket for the heel, and a partly plain and partly ribbed, or wholly ribbed extension for the foot portion, with a plain pocket for the toe. The fabric thus made can be continued of indefinite length, and a portion severed therefrom, and the cut edges so united as to form a stocking, seamless excepting at the toe.

Having thus described my invention, what I claim as new, and desire to secure by Letters Patent, is—

1. A circular knitting machine having a stationary needle cylinder, a rotatable cam cylinder, a needle dial, a cam dial, a shaft in connection with said cam dial, and provided with a collar, a carrier secured to the cam cylinder and supporting said shaft, mechanism substantially as described for disconnecting said collar from said carrier, and mechanism substantially as described for locking said cam and needle dials, said parts being combined, substantially as set forth.

2. The combination of a stationary needle cylinder, a needle dial, a rotatable cam cylinder with a carrier, a cam dial with a shaft having a collar supported by said carrier, and means substantially as described for connecting and disconnecting said carrier and collar, substantially as set forth.

3. The combination of a stationary needle cylinder, with a needle dial, a rotatable cam cylinder, a carrier secured to said cam cylinder, a cam dial with shaft having a collar with flange thereon, a plate connected with said carrier and supporting said flanged collar, and a locking device for said flanged collar and carrier, substantially as and for the purpose set forth.

4. A stationary needle cylinder, with a needle dial, a rotatable cam cylinder with a carrier, a plate secured to said carrier, a cam dial with a shaft, a collar secured to said shaft and resting on said plate, said collar and said carrier having recesses thereon, and a locking pin or key adapted to be inserted in said recesses, for locking said collar and carrier, said parts being combined, substantially as and for the purpose set forth.

5. A stationary needle cylinder, a needle dial, a rotatable cam cylinder and a cam dial having a locking connection therewith, said needle dial having a locking arm adapted to lock it and the cam dial together, said parts being combined substantially as described.

6. In a circular knitting machine, a revoluble cam cylinder having an upper and a lower horizontal track on the inner face thereof adapted to support the butts of the cylinder needles thereon, a switch for directing the said needles from one track to the other, and a stationary needle cylinder with needles, said parts being combined substantially as described.

7. In a circular knitting machine, a needle cylinder with grooves in its outer walls having depressed portions, and a horizontal slot in its inner wall, a slotted ring or plate fitted in said slot, a segmental plate having its shank in the slot of the ring or plate, and a lever for operating said segmental plate, said segmental plate having its outer edge provided with projections and recesses, said parts being combined, substantially as described.

8. A stationary needle cylinder with a horizontal recess in its inner wall, and needle grooves in its outer wall, one half of the cylinder having more grooves than the other half for extra needles, a slotted plate fitted in said horizontal recess, a segmental plate with projections and recesses on its outer edge, and having a shank or stem in the slot of the slotted plate, and a lever for operating said segmental plate, said parts being combined, substantially as and for the purpose set forth.

9. In a circular knitting machine, a stationary needle cylinder, a needle dial, a rotatable cam cylinder with a carrier having a recess in its inner edge, a plate secured to said carrier, a cam dial with shaft, a collar secured to said shaft, and having a flange with a recess in its outer edge, said flange bearing on the said plate, a spring-actuated pin with cam head, a lever with cam adapted to engage said cam head of the pin, so as to raise the same, and thereby unlock the said carrier and flange of the collar, and an arm adapted to lock the cam and needle dials, said parts being combined, substantially as described.

10. A circular knitting machine having an elevated portion on its base, a rotatable cam cylinder, a frame secured thereto with a rising and falling arm moving therein, and having its lower portion adapted to ride on said elevated portion of the base, and its upper end to clamp a reinforce thread, a thread guide and a bobbin carrier moving with said cam cylinder, said parts being combined, substantially as described.

11. A circular knitting machine having an elevated portion on its base, a rotatable cam cylinder with a frame secured thereto, a rising and falling arm in said frame, having a pivoted portion carrying a roller at its lower end adapted to ride on said elevated portion of the base, a spring for extending said arm and pivoted portion, a thread guide and a bobbin carrier secured to said rising and falling arm, said parts being combined substantially as and for the purpose set forth.

12. In a circular knitting machine, a base with an elevated portion thereon, and a cam on said base and between the ends of the elevated portion, a cam cylinder with a frame secured thereto, an arm moving in said frame and having its upper end adapted to clamp a reinforce thread, and its lower end to ride on said elevated portion of the base, a thread guide and a spring actuated swinging arm with a thread guide at its upper end, and having its lower end adapted to come in contact with said cam, said parts being combined, substantially as described.

13. In a circular knitting machine, a needle cylinder with a horizontally movable segmental plate having projections and recesses formed on its outer edge, a guide for said plate, and an operating lever, said parts being combined, substantially as described.

14. In a circular knitting machine, the combination of a stationary needle cylinder having extra needles working in extra grooves on one side thereof, a cam cylinder, a needle dial, a cam dial with a two-way cam for the needles of the needle dial, a carrier on said cam cylinder detachably secured to the shaft of the cam dial, a segmental plate having recesses and adapted to come in contact with the extra needles, and throw the same in and out of operation, a lever for operating said plate and means substantially as described for locking the cam and needle dials, substantially as and for the purpose set forth.

15. In a circular knitting machine, a stationary needle cylinder with an extra set of needle grooves in one side thereof, a needle dial, a rotatable cam cylinder, a two-way cam dial, and a segmental plate having recesses and projections, and located in said needle cylinder for operating an extra set of needles, working in said extra grooves, said parts being combined substantially as described.

16. A circular knitting machine having a cam cylinder, a needle dial, and a cam dial, and provided with means substantially as described whereby the cam dial may be locked with the needle dial, said parts being combined substantially as described.

17. A circular knitting machine having a cam cylinder, a stationary needle cylinder, a stationary needle dial, a cam dial, a rotatable shaft on which said cam dial is mounted, means substantially as described for connecting said dials, and mechanism substantially as described for connecting said cam cylinder and shaft, said parts being combined, substantially as set forth.

18. A circular knitting machine having a cam cylinder, a needle dial and a cam dial, and provided with means for locking said cam dial with either said cam cylinder or said needle dial, said parts being combined substantially as described.

JOHN B. HIPWELL.

Witnesses:
JOHN A. WIEDERSHEIM,
WM. C. WIEDERSHEIM.